（12） United States Patent
Li (10) Patent No.: US 9,602,429 B2
(45) Date of Patent: Mar. 21, 2017

(54) TRAFFIC ADJUSTMENT METHOD AND APPARATUS (71) Applicant: Huawei Technologies Co., Ltd., Shenzhen (CN)

(72) Inventor: Zhonghua Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/714,919

(22) Filed: May 18, 2015

(65) Prior Publication Data

US 2015/0334048 A1 Nov. 19, 2015

(30) Foreign Application Priority Data

May 19, 2014 (CN) .......................... 2014 1 0211181

(51) Int. Cl.
*H04L 12/927* (2013.01)
*H04L 12/18* (2006.01)
*H04Q 11/00* (2006.01)

(52) U.S. Cl.
CPC ........ *H04L 47/806* (2013.01); *H04L 12/1886* (2013.01); *H04Q 11/0067* (2013.01);
(Continued)

(58) Field of Classification Search
CPC .......... H04L 47/806; H04Q 2011/0083; H04Q 2011/0086
(Continued)

(56) References Cited

U.S. PATENT DOCUMENTS 6,324,184 B1 * 11/2001 Hou ..................... H04L 12/2801
370/468
6,771,599 B1 * 8/2004 Aoyama ............. H04L 12/5602
370/230
(Continued)

FOREIGN PATENT DOCUMENTS

CN 1864433 A 11/2006
EP 0940946 A1 9/1999
WO 2005071903 A1 8/2005

OTHER PUBLICATIONS

Foreign Communication From a Counterpart Application, European Application No. 15161226.4, Extended European Search Report dated Oct. 2, 2015, 7 pages.
(Continued)

*Primary Examiner* — Oommen Jacob
(74) *Attorney, Agent, or Firm* — Conley Rose, P.C.

(57) ABSTRACT

A traffic adjustment method and an apparatus, which relate to the communications field, so that statistics on traffic of a receiving apparatus that needs to receive a first multicast packet can be accurately collected in a process of multicast packet transmission. A specific solution is as follows: A sending apparatus sends a first multicast packet, and determines whether an identity of a first receiving apparatus is in a receiving list of a first group, and if the identity of the first receiving apparatus is in the receiving list of the first group, the sending apparatus acquires multicast traffic of the first receiving apparatus, and subtracts the multicast traffic of the first receiving apparatus from preset traffic allocated to the first receiving apparatus to obtain corrected traffic of the first receiving apparatus.

16 Claims, 3 Drawing Sheets (52) U.S. Cl.
CPC ............... *H04Q 2011/0047* (2013.01); *H04Q 2011/0083* (2013.01); *H04Q 2011/0086* (2013.01)

(58) Field of Classification Search
USPC .................................................. 398/25, 9, 1
See application file for complete search history.

(56) References Cited

U.S. PATENT DOCUMENTS

| | | | | |
|---|---|---|---|---|
| 7,047,311 B2* | 5/2006 | Oishi | ................. | H04L 12/5695 370/229 |
| 7,209,443 B2* | 4/2007 | Mukai | ..................... | H04L 47/10 370/230 |
| 2005/0100036 A1 | 5/2005 | Davis | | |
| 2007/0071031 A1* | 3/2007 | Shin | ..................... | H04J 3/1694 370/468 |
| 2007/0115973 A1* | 5/2007 | Koga | ....................... | H04B 3/54 370/389 |
| 2007/0263625 A1* | 11/2007 | Engstrand | ............. | H04L 12/185 370/390 |
| 2007/0274339 A1* | 11/2007 | Kim | .................... | H04L 12/1877 370/468 |
| 2008/0098446 A1* | 4/2008 | Seckin | .................. | H04L 12/185 725/114 |
| 2012/0294611 A1* | 11/2012 | Adler | ................. | H04Q 11/0067 398/45 |
| 2013/0209103 A1 | 8/2013 | Melts et al. | | |
| 2013/0315071 A1* | 11/2013 | Yoshida | .............. | H04L 43/0817 370/241.1 |
| 2015/0334048 A1* | 11/2015 | Li | ......................... | H04L 47/806 398/25 |

OTHER PUBLICATIONS

Foreign Communication From a Counterpart Application, Chinese Application No. 201410211181.2, Chinese Office Action dated Nov. 8, 2016, 7 pages.

* cited by examiner

TRAFFIC ADJUSTMENT METHOD AND APPARATUS

CROSS-REFERENCE TO RELATED APPLICATIONS

This application claims priority to Chinese Patent Application No. 201410211181.2, filed on May 19, 2014, which is hereby incorporated by reference in its entirety.

TECHNICAL FIELD

The present invention relates to the communications field, and in particular, to a traffic adjustment method and an apparatus.

BACKGROUND

A Gigabit capability Passive Optical Network (GPON) system generally includes an Optical Line Terminal (OLT) on a network side and an Optical Network Unit (ONU) on a user side. One OLT may be connected to multiple ONUs, and signals are distributed to multiple ONUs using a splitter on the user side.

In the GPON system, a packet sent by the OLT to each ONU is sent using a broadcast multicast packet manner. That is, each packet can be received by each ONU, the ONU determines whether the packet is sent to the ONU, and then discards a packet that is not sent to the ONU.

In the prior art, a multicast packet sent by an OLT to multiple ONUs only needs to be sent once using a broadcasting manner, and each ONU can receive a packet that is considered to be sent to the ONU. In this case, network bandwidth may be saved. However, only some ONUs need the multicast packet, which, however, is not needed by each ONU. As a result, the OLT cannot control traffic of the multicast packet, where the traffic is network transmission bandwidth, and some ONUs receive the packet that they do not need, thereby wasting traffic. If the OLT does not collect statistics on the traffic of the multicast packet, traffic statistics on ONUs that need the multicast packet are inaccurate.

SUMMARY

Embodiments of the present invention provide a traffic adjustment method and an apparatus, so that statistics on traffic of a receiving apparatus that needs to receive a first multicast packet can be accurately collected in a process of multicast packet transmission.

To achieve the foregoing objective, the following technical solutions are used in the embodiments of the present invention.

According to a first aspect, a traffic adjustment method is provided, including sending, by a sending apparatus, a first multicast packet, where the first multicast packet is a packet that needs to be received by all receiving apparatuses in a first group, and the first group comprises at least two receiving apparatuses; determining, by the sending apparatus, whether an identity of a first receiving apparatus is in a receiving list of the first group, where the receiving list of the first group is a list of identities of all the receiving apparatuses in the first group; acquiring, by the sending apparatus, multicast traffic of the first receiving apparatus if the identity of the first receiving apparatus is in the receiving list of the first group, where the multicast traffic of the first receiving apparatus is traffic used by the first receiving apparatus for receiving the first multicast packet; and subtracting, by the sending apparatus, the multicast traffic of the first receiving apparatus from preset traffic allocated to the first receiving apparatus to obtain corrected traffic of the first receiving apparatus.

With reference to the first aspect, in a first possible implementation manner, where the acquiring, by the sending apparatus, multicast traffic of the first receiving apparatus includes replicating, by the sending apparatus, the first multicast packet to generate a marked packet, where the marked packet includes a length of the first multicast packet; and the subtracting, by the sending apparatus, the multicast traffic of the first receiving apparatus from preset traffic allocated to the first receiving apparatus to obtain corrected traffic of the first receiving apparatus includes subtracting, by the sending apparatus, the length of the first multicast packet included in the marked packet from the preset traffic to obtain the corrected traffic of the first receiving apparatus; and discarding the marked packet.

With reference to the first aspect, in a second possible implementation manner, where the acquiring, by the sending apparatus, multicast traffic of the first receiving apparatus includes receiving, by the sending apparatus, traffic information sent by the first receiving apparatus, and acquiring the multicast traffic of the first receiving apparatus according to the traffic information, where the traffic information is used to indicate a size of the multicast traffic of the first receiving apparatus.

With reference to any possible implementation manner from the first aspect to the second possible implementation manner of the first aspect, in a third possible implementation manner, before the determining, by the sending apparatus, whether an identity of a first receiving apparatus is in a receiving list of the first group, the method further includes recording, by the sending apparatus, an identity of each receiving apparatus in the first group and generating the receiving list of the first group.

With reference to any possible implementation manner from the first aspect to the third possible implementation manner of the first aspect, in a fourth possible implementation manner, the method is applied to a GPON, or applied to an Ethernet passive optical network (EPON); where the sending apparatus is an OLT, and the first receiving apparatus is an ONU.

According to a second aspect, a sending apparatus is provided, including a sending unit configured to send a first multicast packet, where the first multicast packet is a packet that needs to be received by all receiving apparatuses in a first group, and the first group includes at least two receiving apparatuses; a maintenance unit configured to determine whether an identity of a first receiving apparatus is in a receiving list of the first group, where the receiving list of the first group is a list of identities of all the receiving apparatuses in the first group; an acquiring unit configured to, after the maintenance unit determines that the identity of the first receiving apparatus is in the receiving list of the first group, acquire multicast traffic of the first receiving apparatus, where the multicast traffic of the first receiving apparatus is traffic used by the first receiving apparatus for receiving the first multicast packet; and a traffic control unit configured to subtract the multicast traffic of the first receiving apparatus acquired by the acquiring unit from preset traffic allocated to the first receiving apparatus to obtain corrected traffic of the first receiving apparatus.

With reference to the second aspect, in a first possible implementation manner, where the acquiring unit includes a marking subunit; the marking subunit is configured to replicate the first multicast packet to generate a marked packet, wherein the marked packet comprises a length of the first multicast packet; and the traffic control unit is further configured to subtract the length of the first multicast packet from the preset traffic to obtain the corrected traffic of the first receiving apparatus; and discard the marked packet.

With reference to the second aspect, in a second possible implementation manner, the acquiring unit includes a receiving subunit; and the receiving subunit is configured to receive traffic information sent by the first receiving apparatus, and acquire the multicast traffic of the first receiving apparatus according to the traffic information, wherein the traffic information is used to indicate a size of the multicast traffic of the first receiving apparatus.

With reference to any possible implementation manner from the second aspect to the second possible implementation manner of the second aspect, in a third possible implementation manner, the maintenance unit is further configured to record an identity of each receiving apparatus in the first group and generate the receiving list of the first group.

With reference to any possible implementation manner from the second aspect to the third possible implementation manner of the second aspect, in a fourth possible implementation manner, the sending apparatus is applied to a GPON, or applied to an EPON; where the sending apparatus is an OLT, and the first receiving apparatus is an ONU.

According to a traffic adjustment method and an apparatus provided by the embodiments of the present invention, a sending apparatus sends a first multicast packet, and determines whether an identity of a first receiving apparatus is in a receiving list of a first group, and if the identity of the first receiving apparatus is in the receiving list of the first group, the sending apparatus acquires multicast traffic of the first receiving apparatus, and subtracts the multicast traffic of the first receiving apparatus from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
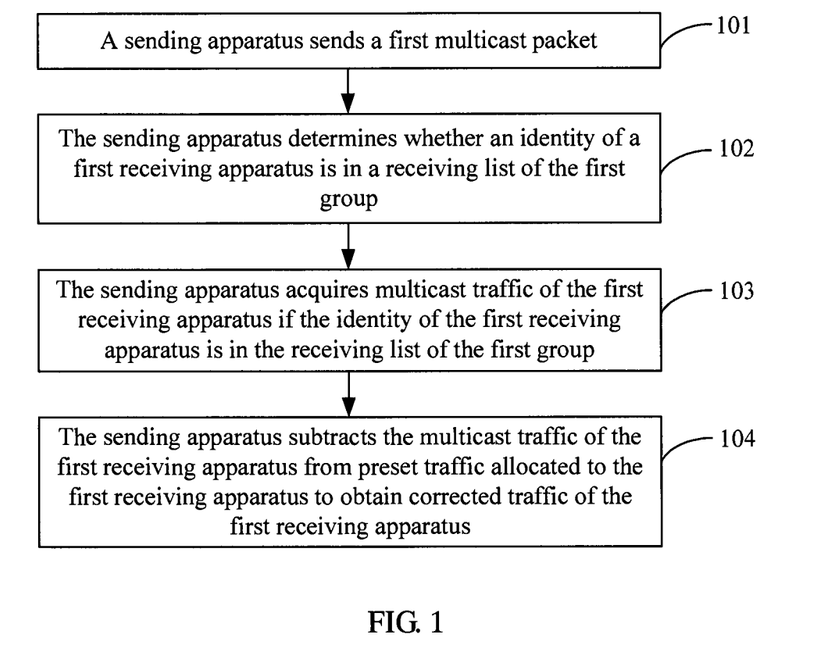
FIG. 1 is a schematic flowchart of a traffic adjustment method according to an embodiment of the present invention.

An embodiment of the present invention provides a traffic adjustment method, as shown in FIG. 1, including the following steps:

101. A sending apparatus sends a first multicast packet.

The first multicast packet is a packet that needs to be received by all receiving apparatuses in a first group, and the first group includes at least two receiving apparatuses.

Optionally, in a point-to-multipoint network, for example, a GPON or an EPON, the sending apparatus establishes connections with multiple receiving apparatuses. When a packet is sent, the packet sent by the sending apparatus is received by each receiving apparatus with which a connection is established by the sending apparatus, that is, the sending apparatus sends the packet in a broadcasting manner. Each receiving apparatus determines whether the sent packet is needed by the receiving apparatus. If it is not needed, the receiving apparatus discards the packet; and if it is needed, the receiving apparatus saves the packet and performs further processing on the received packet. Optionally, the sending apparatus may be an OLT, and the receiving apparatus may be an ONU.

Herein, the first group is a set of all receiving apparatuses that need to receive the first multicast packet. Optionally, the multicast packet is a packet that needs to be received by multiple receiving apparatuses. Correspondingly, a unicast packet is a packet that needs to be received by only one receiving apparatus. This embodiment mainly resolves a problem of inaccurate adjustment of traffic for a single receiving apparatus when a multicast packet is sent. In this embodiment of the present invention, the sending apparatus, as a traffic management apparatus for each receiving apparatus, collects statistics on and manages traffic of each receiving apparatus. The traffic is bandwidth occupied when the receiving apparatus receives a packet from the sending apparatus, and a unit of the traffic may be byte, bit, and the like.

102. The sending apparatus determines whether an identity of a first receiving apparatus is in a receiving list of the first group.

The receiving list of the first group is a list of identities of all the receiving apparatuses in the first group.

Optionally, before sending a first multicast packet, the sending apparatus may establish the receiving list of the first group according to receiving apparatuses included in the first group and record an identity of each receiving apparatus in the first group in the receiving list of the first group.

Optionally, in a point-to-multipoint network, for example, the sending apparatus establishes connections with N receiving apparatuses, where N is an integer greater than or equal to 2, and may number the N receiving apparatuses sequentially from 1 to N as an identity of each receiving apparatus and record numbers of all the receiving apparatuses in the first group in the receiving list of the first group. Alternatively, optionally, physical addresses of receiving apparatuses serve as identities of the receiving apparatuses. For specific content included in an identity, the present invention sets no limitation so long as different receiving apparatuses can be distinguished. In this way, adjustment of traffic of each receiving apparatus may be performed more accurately using the receiving list of the first group when the first multicast packet is transmitted.

103. The sending apparatus acquires multicast traffic of the first receiving apparatus if the identity of the first receiving apparatus is in the receiving list of the first group.

The multicast traffic of the first receiving apparatus is traffic used by the first receiving apparatus for receiving the first multicast packet.

Optionally, this embodiment provides two specific solutions to acquiring multicast traffic, which, certainly, does not indicate that a method for acquiring multicast traffic in the present invention is limited only to the two solutions. Herein, the two solutions are only used as examples for description.

First solution: A receiving apparatus reports, to the sending apparatus, traffic of a multicast packet received by the receiving apparatus. Optionally, traffic of multicast packets reported by receiving apparatuses may be different or may be the same. In this case, the sending apparatus collects statistics on traffic of multicast packets reported by the receiving apparatuses in the first group, so that preset traffic of the receiving apparatuses in the first group may further be adjusted. The sending apparatus receives traffic information sent by a first apparatus, and acquires multicast traffic according to the traffic information, where the traffic information is used to indicate a size of the multicast traffic.

Second solution: A sending apparatus replicates a first multicast packet to generate a marked packet, where the marked packet includes a length of the first multicast packet. Optionally, the marked packet may have no content but only indicate the length of the first multicast packet. Optionally, for a first receiving apparatus, the marked packet is sent as a unicast packet but is not actually sent. After the sending apparatus delivers an instruction of sending the marked packet, traffic of the marked packet is subtracted from preset traffic of the first receiving apparatus. That is, after the length of the first multicast packet is subtracted from the preset traffic of the first apparatus, the marked packet is discarded and is not sent.

104. The sending apparatus subtracts the multicast traffic of the first receiving apparatus from preset traffic allocated to the first receiving apparatus to obtain corrected traffic of the first receiving apparatus.

Optionally, referring to steps 101 to 104, the sending apparatus may also adjust preset traffic of other receiving apparatuses, except the first receiving apparatus, in the first group. The sending apparatus may adjust the preset traffic of the receiving apparatuses in the first group one by one according to identities of the receiving apparatuses in the receiving list of the first group; or optionally, the sending apparatus sequentially performs determining on the receiving apparatuses with which connections are established by the sending apparatus. If an identity of a receiving apparatus is in the receiving list of the first group, multicast traffic is subtracted from preset traffic of the receiving apparatus; and if the identity of the receiving apparatus is not in the receiving list of the first group, the preset traffic of the receiving apparatus is not adjusted.

Optionally, the preset traffic of the first receiving apparatus indicates a maximum of packets of the preset traffic that the first receiving apparatus can receive. In an implementation process, the sending apparatus allocates partial traffic per second to the first receiving apparatus, and each time one second elapses, the partial traffic allocated to the first receiving apparatus is added to the preset traffic. If the preset traffic of the first receiving apparatus is used up, a packet that is needed by the first receiving apparatus can be sent to the first receiving apparatus only until a next second at which new traffic is allocated. In this case, it is avoided that all traffic is consumed by a receiving apparatus. For example, bandwidth of the sending apparatus, that is, a data transmission rate is 8 megabyte/second, that is, traffic of the sending apparatus per second is 8 megabytes. If the sending apparatus is connected to four receiving apparatuses and it is assumed that allocated bandwidth of one receiving apparatus per second, that is, traffic is 2 megabyte (MB), it indicates that within one second one receiving apparatus may receive a maximum of 2 megabytes of packets that are needed by the one receiving apparatus. If the traffic of the receiving apparatus within the one second is not used up, the traffic may be accumulated and the preset traffic is all traffic that the receiving apparatus currently has. Because the sending apparatus sends a packet in the broadcasting manner, if the packet received by the receiving apparatus is needed by another receiving apparatus but not needed by the receiving apparatus, the packet is discarded and traffic occupied by the packet is not subtracted from the preset traffic; and if the packet received by the receiving apparatus is needed by the receiving apparatus, the packet is retained and the preset traffic of the receiving apparatus minus the traffic occupied by the packet is remaining traffic of the receiving apparatus.

According to a traffic adjustment method provided by this embodiment of the present invention, a sending apparatus sends a first multicast packet, and determines whether an identity of a first receiving apparatus is in a receiving list of a first group, and if the identity of the first receiving apparatus is in the receiving list of the first group, the sending apparatus acquires multicast traffic of the first receiving apparatus, and subtracts the multicast traffic of the first receiving apparatus from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

With reference to the embodiment corresponding to the foregoing FIG. 1, an embodiment of the present invention provides a sending apparatus configured to implement the traffic adjustment method described in the embodiment corresponding to the foregoing FIG. 1. Optionally, this embodiment may be applied to a GPON, or applied to an EPON, and the sending apparatus may be an OLT, and a receiving apparatus may be an ONU.

Figure 2:
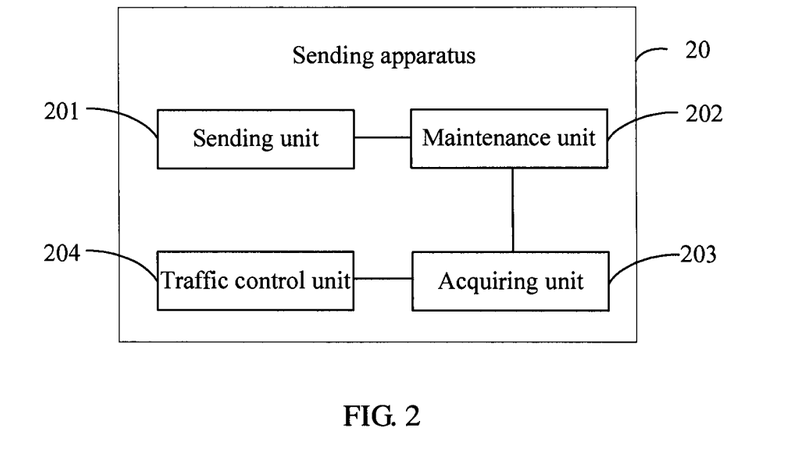
FIG. 2 is a schematic structural diagram of a sending apparatus according to an embodiment of the present invention.

Referring to FIG. 2, the sending apparatus 20 includes a sending unit 201, a maintenance unit 202, an acquiring unit 203 and a traffic control unit 204.

The sending unit 201 is configured to send a first multicast packet, where the first multicast packet is a packet that needs to be received by all receiving apparatuses in a first group, and the first group includes at least two receiving apparatuses.

The maintenance unit 202 is configured to determine whether an identity of a first receiving apparatus is in a receiving list of the first group, where the receiving list of the first group is a list of identities of all the receiving apparatuses in the first group.

The acquiring unit 203 is configured to, after the maintenance unit 202 determines that the identity of the first receiving apparatus is in the receiving list of the first group, acquire multicast traffic of the first receiving apparatus, where the multicast traffic of the first receiving apparatus is traffic used by the first receiving apparatus for receiving the first multicast packet.

The traffic control unit 204 is configured to subtract the multicast traffic of the first receiving apparatus acquired by the acquiring unit 203 from preset traffic allocated to the first receiving apparatus to obtain corrected traffic of the first receiving apparatus.

According to a sending apparatus provided by this embodiment of the present invention, a first multicast packet is sent, it is determined whether an identity of a first receiving apparatus is in a receiving list of a first group, and if the identity of the first receiving apparatus is in the receiving list of the first group, multicast traffic of the first receiving apparatus is acquired and the multicast traffic of the first receiving apparatus is subtracted from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

Figure 3:
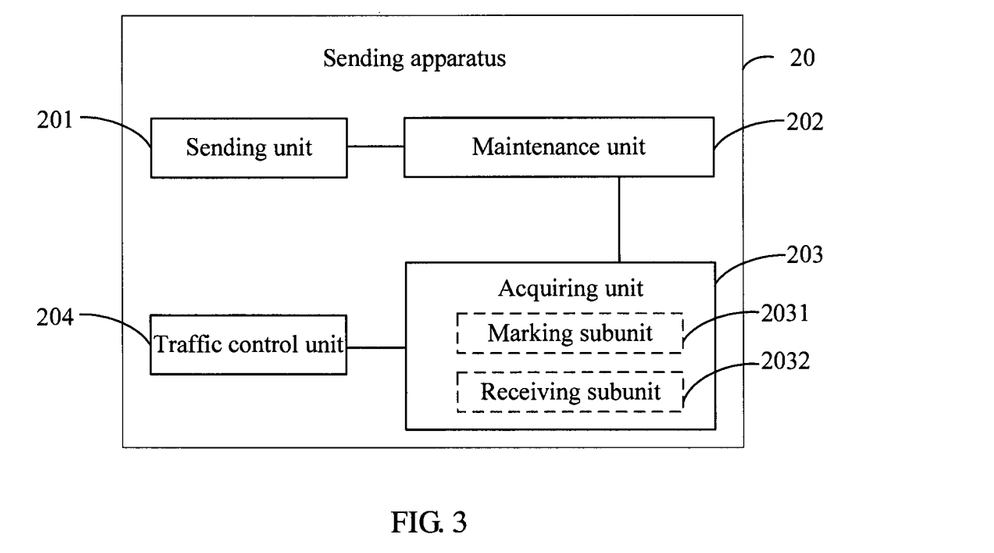
FIG. 3 is a schematic structural diagram of another sending apparatus according to an embodiment of the present invention.

Optionally, referring to FIG. 3, the acquiring unit 203 includes a marking subunit 2031.

The marking subunit 2031 is configured to replicate a first multicast packet to generate a marked packet, where the marked packet includes a length of the first multicast packet.

The traffic control unit 204 is further configured to subtract the length of the first multicast packet from the preset traffic to obtain the corrected traffic of the first receiving apparatus; and discard the marked packet.

Alternatively, optionally, the acquiring unit 203 includes a receiving subunit 2032.

The receiving subunit 2032 is configured to receive traffic information sent by the first receiving apparatus, and acquire the multicast traffic of the first receiving apparatus according to the traffic information, where the traffic information is used to indicate a size of the multicast traffic of the first receiving apparatus.

Optionally, the maintenance unit 202 is further configured to record an identity of each receiving apparatus in the first group and generate the receiving list of the first group.

According to a sending apparatus provided by this embodiment of the present invention, a first multicast packet is sent, it is determined whether an identity of a first receiving apparatus is in a receiving list of a first group, and if the identity of the first receiving apparatus is in the receiving list of the first group, multicast traffic of the first receiving apparatus is acquired and the multicast traffic of the first receiving apparatus is subtracted from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

Figure 4:
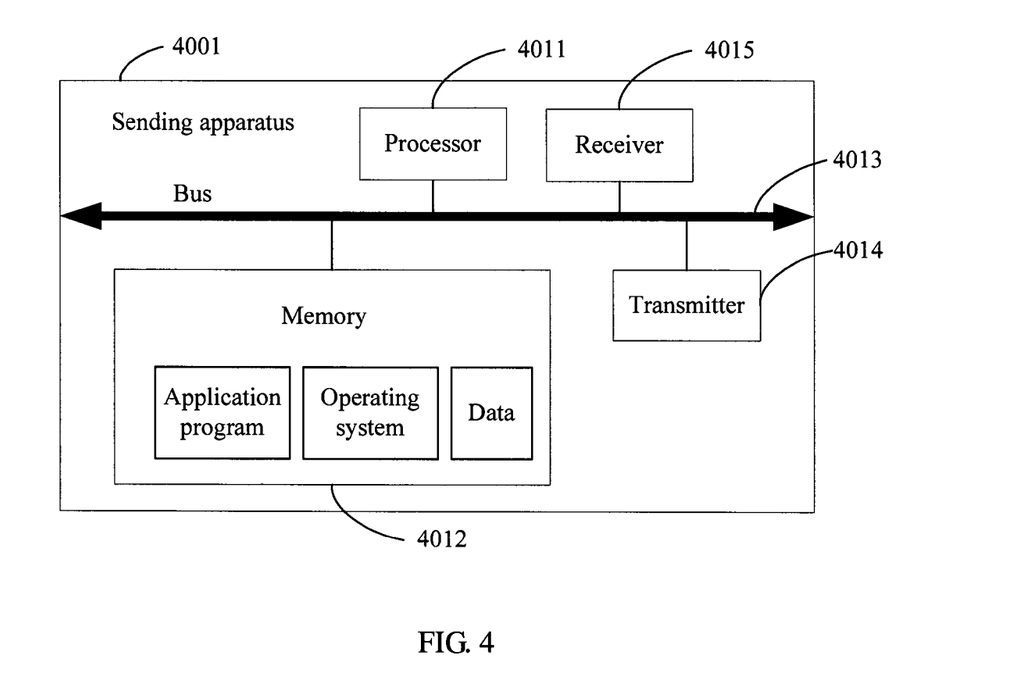
FIG. 4 is a schematic structural diagram of a sending apparatus according to another embodiment of the present invention.

Another embodiment of the present invention provides a sending apparatus 4001. Referring to FIG. 4, the device may be embedded in or the device itself may be a microcomputer, such as a general-purpose computer, a machine customized for a customer, or a portable device such as a mobile phone terminal or a tablet computer. The sending apparatus 4001 includes at least one processor 4011, a memory 4012, a bus 4013, a transmitter 4014, and a receiver 4015, where the at least one processor 4011, the memory 4012, the transmitter 4014 and the receiver 4015 are connected and complete mutual communication using the bus 4013. Further, optionally, the transmitter 4014 and the receiver 4015 may be connected to a receiving apparatus using an optical transmission medium.

The bus 4013 may be an Industry Standard Architecture (ISA) bus, a Peripheral Component Interconnect (PCI) bus, an Extended Industry Standard Architecture (EISA) bus, or the like. The bus 4013 may be categorized into an address bus, a data bus, a control bus, and the like. To facilitate denotation, only one bold line is used in FIG. 4 to represent the bus, which, however, does not indicate that there is only one bus or only one type of buses.

The memory 4012 is configured to store code of application programs that execute the solutions of the present invention, and the processor 4011 controls execution of the application programs. As shown in FIG. 4, the memory 4012 may further store an operating system program that is needed for executing the application programs, packet data, and the like.

The memory may be a read-only memory (ROM) or a static storage device of another type that may store static information and instructions, a random access memory (RAM), or a dynamic storage device of another type that may store information and instructions; and may also be an electrically erasable programmable read-only memory (EEPROM), a compact disc read-only memory (CD-ROM) or another compact disc storage, optical disc storage (including a compact disc, a laser disc, an optical disc, a digital versatile disc, and a blue-ray disc, or the like), and a disk storage medium or another magnetic storage device, or any other medium that can be used to carry or store expected program code in an instruction or data structure form and can be accessed by a computer, which, however, is not limited herein. Such memories are connected to the processor using the bus.

The processor 4011 may be a central processing unit (CPU), or an application specific integrated circuit (ASIC), or one or more integrated circuits configured to implement this embodiment of the present invention.

The processor 4011 is configured to invoke program code in the memory 4012 so as to perform operations of the maintenance unit, the acquiring unit, and the traffic control unit in the device embodiment corresponding to the foregoing FIG. 2 and FIG. 3 or to perform a procedure of the method corresponding to FIG. 1. For specific description, refer to the embodiments corresponding to FIG. 1, FIG. 2 and FIG. 3, and details are not described herein again.

According to a sending apparatus provided by this embodiment of the present invention, a first multicast packet is sent, it is determined whether an identity of a first receiving apparatus is in a receiving list of a first group, and if the identity of the first receiving apparatus is in the receiving list of the first group, multicast traffic of the first receiving apparatus is acquired and the multicast traffic of the first receiving apparatus is subtracted from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

Figure 5:
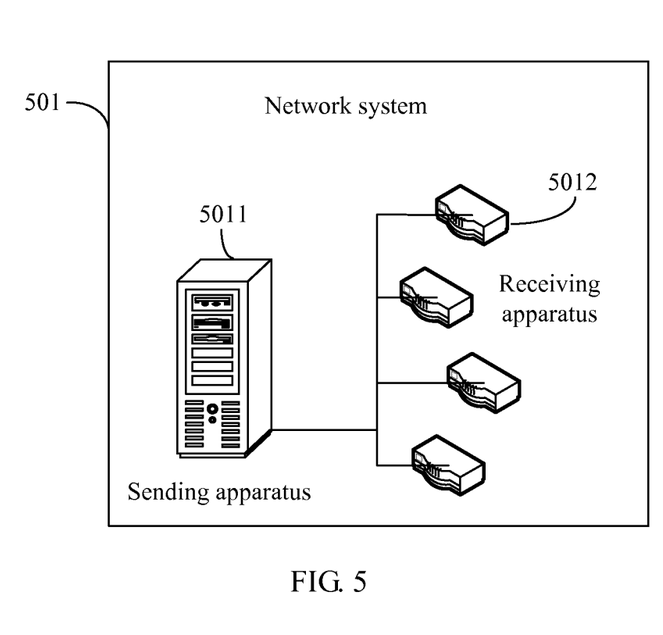
FIG. 5 is a schematic structural diagram of a network system according to an embodiment of the present invention.

With reference to the apparatus embodiment corresponding to FIG. 2, an embodiment of the present invention provides a network system. Optionally, this embodiment may be applied to a GPON, or applied to an EPON. Referring to FIG. 5, the network system 501 includes a sending apparatus 5011 and a receiving apparatus 5012.

The sending apparatus 5011 is the sending apparatus described in the embodiment corresponding to FIG. 2 or FIG. 3. The sending apparatus 5011 is configured to send a first multicast packet and determine that an identity of a first receiving apparatus is in a receiving list of a first group, and if the identity of the first receiving apparatus is found in the receiving list of the first group, the sending apparatus acquires multicast traffic of the first receiving apparatus, and subtracts the multicast traffic from preset traffic of the first receiving apparatus, where the first receiving apparatus belongs to the receiving apparatus 5012.

The receiving apparatus 5012 is configured to receive a first multicast packet sent by the sending apparatus 5011.

Optionally, the receiving apparatus 5012 is further configured to send, to the sending apparatus 5011, multicast traffic of the first multicast packet received by the receiving apparatus 5012, so that the first receiving apparatus subtracts the multicast traffic from the preset traffic.

Optionally, the sending apparatus 5011 may be an OLT, and the receiving apparatus 5012 may be an ONU.

According to a network system provided by this embodiment of the present invention, a sending apparatus sends a first multicast packet, and determines whether an identity of a first receiving apparatus is in a receiving list of a first group, and if the identity of the first receiving apparatus is in the receiving list of the first group, the sending apparatus acquires multicast traffic of the first receiving apparatus, and subtracts the multicast traffic of the first receiving apparatus from preset traffic allocated to the first receiving apparatus to obtain corrected traffic of the first receiving apparatus, so that statistics on traffic of a receiving apparatus that needs to receive the first multicast packet can be accurately collected in a process of multicast packet transmission.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: A computer readable medium may include a RAM, a ROM, an EEPROM, a CD-ROM or another optical disc storage, a disk storage medium or another magnetic storage device, or any other medium that can be used to carry or store expected program code in an instruction or data structure form and can be accessed by a computer. In addition, any connection may be appropriately defined as a computer-readable medium. For example, if software is transmitted from a website, a server or another remote source using a coaxial cable, an optical fiber/cable, a twisted pair, a Digital Subscriber Line (DSL) or a wireless technology, such as infrared ray, radio, and microwave, the coaxial cable, optical fiber/cable, twisted pair, DSL or a wireless technology, such as infrared ray, radio, and microwave, is included in the defined medium. As used in the present invention, the disk and the disc include a CD, a laser disc, an optical disc, a digital versatile disc (DVD), a floppy disk and a Blue-ray disc, where the disk generally copies data by a magnetic means, and the disc copies data optically by a laser means. The foregoing combination shall also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A traffic adjustment method comprising:
    sending a first multicast packet, wherein the first multicast packet is a packet that needs to be received by all receivers in a first group, and wherein the first group comprises at least two receivers;
    determining whether an identity of a first receiver is in a receiving list of the first group, wherein the receiving list of the first group is a list of identities of all the receivers in the first group;
    receiving traffic information sent by the first receiver;
    acquiring multicast traffic of the first receiver according to the traffic information when the identity of the first receiver is in the receiving list of the first group, wherein the multicast traffic of the first receiver is traffic used by the first receiver for receiving the first multicast packet and the traffic information is used to indicate the multicast traffic of the first receiver; and
    subtracting the multicast traffic of the first receiver from preset traffic allocated to the first receiver to obtain corrected traffic of the first receiver,
    wherein the corrected traffic is remaining traffic that is not used by the receiver.

2. A traffic adjustment method comprising:
    sending a first multicast packet, wherein the first multicast packet is a packet that needs to be received by all receivers in a first group, and wherein the first group comprises at least two receivers;
    determining whether an identity of a first receiver is in a receiving list of the first group, wherein the receiving list of the first group is a list of identities of all the receivers in the first group;
    replicating the first multicast packet to generate a marked packet when the identity of the first receiver is in the receiving list of the first group, wherein the marked packet comprises a length of the first multicast packet;
    subtracting the length of the first multicast packet comprised in the marked packet from preset traffic allocated to the first receiver to obtain the corrected traffic of the first receiver, wherein the corrected traffic is remaining traffic that is not used by the receiver; and
    discarding the marked packet.

3. The method according to claim 1, wherein before determining whether the identity of the first receiver is in the receiving list of the first group, the method further comprises:
    recording an identity of each receiver in the first group; and
    generating the receiving list of the first group.

4. The method according to claim 1, wherein the method is implemented in a gigabit capability passive optical network (GPON) by an optical line terminal (OLT), and wherein the first receiver is an optical network unit (ONU).

5. An apparatus comprising:
    a hardware processor; and
    a non-transitory memory coupled to the hardware processor,
    wherein the hardware processor is configured to execute instructions or codes in the non-transitory memory to perform operations of:
        sending a first multicast packet, wherein the first multicast packet is a packet that needs to be received by all receivers in a first group, and wherein the first group comprises at least two receivers;

determining whether an identity of a first receiver is in a receiving list of the first group, wherein the receiving list of the first group is a list of identities of all the receivers in the first group;

receiving traffic information sent by the first receiver and acquiring multicast traffic of the first receiver according to the traffic information when the identity of the first receiver is in the receiving list of the first group, wherein the multicast traffic of the first receiver is traffic used by the first receiver for receiving the first multicast packet and the traffic information is used to indicate the multicast traffic of the first receiver; and subtracting the multicast traffic of the first receiver acquired by the acquiring unit from preset traffic allocated to the first receiver to obtain corrected traffic of the first receiver, and wherein the corrected traffic is remaining traffic that is not used receiver.

6. An apparatus comprising:

a hardware processor; and a non-transitory memory coupled to the hardware processor, wherein the hardware processor being configured to execute instructions or codes in the non-transitory memory to perform operations of:

sending a first multicast packet, wherein the first multicast packet is a packet that needs to be received by all receivers in a first group, and wherein the first group comprises at least two receivers;

determining whether an identity of a first receiver is in a receiving list of the first group, wherein the receiving list of the first group is a list of identities of all the receivers in the first group;

replicating the first multicast packet to generate a marked packet when the identity of the first receiver is in the receiving list of the first group, wherein the marked packet comprises a length of the first multicast packet;

subtracting the length of the first multicast packet from preset traffic allocated to the first receiver to obtain the corrected traffic of the first receiver, wherein the corrected traffic is remaining traffic that is not used by the receiver; and discarding the marked packet.

7. The apparatus according to claim 5, wherein the hardware processor is further configured to record an identity of each receiver in the first group and generate the receiving list of the first group.

8. The apparatus according to claim 5, wherein the apparatus is part of a passive optical network (GPON), wherein the apparatus is an optical line terminal (OLT), and wherein the first receiver is an optical network unit (ONU).

9. The method according to claim 1, wherein the method is implemented in an Ethernet passive optical network (EPON) by an optical line terminal (OLT), and wherein the first receiver is an optical network unit (ONU).

10. The apparatus according to claim 6, wherein the apparatus is part of an Ethernet passive optical network (EPON), wherein the apparatus is an optical line terminal (OLT), and wherein the first receiver is an optical network unit (ONU).

11. The method according to claim 2, wherein before determining whether the identity of the first receiver is in the receiving list of the first group, the method further comprises:

recording an identity of each receiver in the first group; and generating the receiving list of the first group.

12. The method according to claim 2, wherein the method is implemented in a gigabit capability passive optical network (GPON) by an optical line terminal (OLT), and wherein the first receiver is an optical network unit (ONU).

13. The method according to claim 2, wherein the method is implemented in an Ethernet passive optical network (EPON) by an optical line terminal (OLT), and wherein the first receiver is an optical network unit (ONU).

14. The apparatus according to claim 6, wherein the hardware processor is further configured to record an identity of each receiver in the first group and generate the receiving list of the first group.

15. The apparatus according to claim 6, wherein the apparatus is part of a gigabit capability passive optical network (GPON), wherein the apparatus is an optical line terminal (OLT), and wherein the first receiver is an optical network unit (ONU).

16. The apparatus according to claim 6, wherein the apparatus is part of an Ethernet passive optical network (EPON), wherein the apparatus is an optical line terminal (OLT), and wherein the first receiver is an optical network unit (ONU).

* * * * *